United States Patent [19]
Jones

[11] 3,890,109
[45] June 17, 1975

[54] RAZOR BLADES HAVING HIGH PURITY Al₂O₃ COATING

[75] Inventor: Frederick O. Jones, Bracknell, England

[73] Assignee: Wilkinson Sword Limited, London, England

[22] Filed: Apr. 6, 1973

[21] Appl. No.: 349,269

[30] Foreign Application Priority Data
Apr. 8, 1972 United Kingdom............... 16297/72

[52] U.S. Cl................................. 29/195; 30/346.53
[51] Int. Cl....................... B32b 15/04; B26b 21/54
[58] Field of Search.......... 29/195 P, 195 M, 195 T; 30/346.53

[56] References Cited
UNITED STATES PATENTS

| | | | |
|---|---|---|---|
| 3,402,468 | 9/1968 | Kiss et al. | 30/346.53 |
| 3,480,483 | 11/1969 | Wilkinson | 148/6.3 |
| 3,635,811 | 1/1972 | Lane | 204/192 |
| 3,754,329 | 8/1973 | Lane | 30/346.53 |
| 3,774,703 | 11/1973 | Sanderson | 117/75 |

*Primary Examiner*—L. Dewayne Rutledge
*Assistant Examiner*—E. L. Weise
*Attorney, Agent, or Firm*—Wolfe, Hubbard, Leydig, Voit & Osann, Ltd.

[57] ABSTRACT

This invention relates to razor blades and methods of manufacture thereof. The invention provides razor blades having an alumina coating on and/or adjacent a cutting edge of the blades. The alumina contains at the most low concentrations of impurities and thereby improves the shaving properties of razor blades since, for example, coatings of polymers which improve the shaving properties of razor blades generally adhere well to the alumina coatings. The coatings can be deposited by sputtering from an alumina source or reactive deposition from an aluminium source in an atmosphere containing oxygen.

12 Claims, No Drawings

RAZOR BLADES HAVING HIGH PURITY Al₂O₃ COATING

This invention relates to razor blades and to methods of manufacture thereof.

It has been proposed to provide at least the cutting edge of razor blades with a coating of certain materials in order to improve the shaving properties of the blades. Materials which have been proposed include, for example, certain compounds of metals and certain polymers.

One compound of a metal which has been proposed for use on at least the cutting edge of razor blades is alumina. However, it has been found that polymer coatings applied to alumina coatings on razor blades often do not adhere well to the alumina coating and the good shaving properties which the polymer coating can otherwise give the blade are not attained.

It is one object of the present invention to provide razor blades having an alumina coating on at least a cutting edge thereof to which an adherent coating of a polymer which improves the shaving properties of the blade can be applied.

According to the present invention there is provided a razor blade having an alumina coating on and/or adjacent a cutting edge thereof, the alumina containing a low concentration of impurities, namely less than $3 \times 10^{-3}$ atomic percent and preferably less than $1 \times 10^{-3}$ atomic percent.

The invention further provides a method of manufacturing a razor blade, which method comprises depositing a coating of alumina containing a low concentration of impurities on and/or adjacent the cutting edge of the blade.

Satisfactory adherent coatings of polymers which improve the shaving characteristics of the blades can be formed on these alumina coatings.

Without limitation of the scope of the invention, it is believed that the presence of impurities in an alumina coating lowers the surface energy of the alumina surface and that this in turn lowers the adhesive bond formed between the alumina coating and the polymer coating. Furthermore, the presence, for example, of certain mono- and di-valent metal impurities may confer sufficient water solubility on the surface of the alumina coating to reduce the adhesion of the polymer coat.

Examples of mono- and di-valent metals which are preferably absent or, when present, should occur in at the most a low concentration include the alkali metals e.g. sodium and potassium, the alkaline earth metals e.g. calcium and magnesium and certain transition metals, e.g. copper and ferrous iron. Sodium is frequently found in commercially available alumina. The mono- and di-valent metals will generally, when present in the coatings, occur in a chemically combined form.

As stated above, commercially available forms of alumina which can be used to form alumina coatings on razor blades frequently contain sodium and the concentration thereof should be low. However, other impurities than those derived from mono- and di-valent metals may also be present in alumina, especially in commercially available alumina, for example silica and water.

Although the concentration of these other impurities is believed to be generally of lesser importance than the total concentration of mono- and di-valent metals, these other impurities should be present in as low a concentration as possible. For example, the water content should be as low as possible since it will increase the time taken to establish the desired vacuum when vacuum deposition techniques are used to form the coatings. The alumina used to form the coatings and the alumina coatings formed therefrom should generally be at least 99.7% pure and preferably at least 99.9% pure.

The alumina coatings may be produced by known methods. Sputtering methods have been found convenient although vapour deposition methods may, if desired, by used.

The alumina may be deposited, for example, using radio frequency sputtering techniques with the alumina being deposited from an alumina source of appropriate purity, that is with the total concentration, for example of mono- and di-valent metals therein, being low. When alumina is used as the source of the alumina coating on the blades, the sputtering should generally be effected in an inert atmosphere, for example with the residual gas being an inert gas such as argon.

It is also possible to form the alumina coating on razor blades using direct current sputtering of aluminum in a reactive atmosphere containing oxygen. Although the residual gas providing the reaction atmosphere could be pure oxygen, it is generally preferred to use oxygen diluted with an inert gas, for example argon. The composition of mixtures of oxygen with an inert gas can be varied within wide limits, for example the mixture can contain up to 98% by volume of the inert gas although less than 50% by volume will generally be used.

Radio frequency or direct current sputtering may be effected at a residual gas pressure of from 0.1 to 10 microns.

The purity of alumina coatings produced using aluminum as the source of the alumina is generally higher than that of alumina coatings produced from a source of solid alumina. High purity aluminum is commercially available having a purity of at least 99.98% and consequently alumina coatings of correspondingly high purity can be obtained therefrom.

An outer polymer coating may be applied to blades having an alumina coating, with a low total concentration of impurities, using known methods. Any of the conventional polymer coatings used to improve the properties of razor blades may be used, for example those comprising polytetrafluoroethylene or a copolymer of thiocarbonyl fluoride and tetrafluoroethylene.

The alumina coatings of the present invention may be one of a plurality of coatings on the razor blades, other than a polymer coating. However, the alumina coating should be the outer of any such plurality of coatings. When the alumina coating is one of a plurality of coatings, at least one of the other coatings is preferably an edge strengthening coating, for example, a metal or an alloy, preferably chromium or a chromium alloy. By the term "a chromium alloy" is meant alloys of two or more metals, one of which chromium, as defined in co-pending Application No. 241,446.

The alumina coating and/or any other coating, excluding the polymer of copolymer coating, should generally have a total thickness of not more than 500 Angstroms and preferably from 50 to 450 Angstroms, advantageously not more than 300 Angstroms. When a plurality of coatings is used, each coating is preferably from 50 to 450 Angstroms thick.

I claim:

1. A razor blade having an alumina coating on and/or adjacent a cutting edge thereof, the alumina containing less than $3 \times 10^{-3}$ atomic percent of impurities.

2. A razor blade according to claim 1, wherein the alumina coating contains less than $3 \times 10^{-3}$ atomic percent of mono-valent metal impurities.

3. A razor blade according to claim 1, wherein the alumina coating contains less than $3 \times 10^{-3}$ atomic percent of di-valent metal impurities.

4. A razor blade according to claim 2, wherein the alumina contains less than $3 \times 10^{-3}$ atomic percent of alkali metal impurities.

5. A razor blade according to claim 4, wherein the alumina contains less than $1 \times 10^{-3}$ atomic percent of impurities.

6. A razor blade according to claim 1, wherein the alumina is at least 99.7% pure.

7. A razor blade according to claim 6, wherein the alumina is at least 99.9% pure.

8. A razor blade according to claim 1, wherein the blade has a plurality of coatings other than a polymer coating thereon and the alumina coating is the outer of said plurality.

9. A razor blade according to claim 8, wherein the alumina coating is on a coating of a metal or of an alloy.

10. A razor blade according to claim 8, wherein said plurality of coatings other than a polymer coating have a total thickness of not more than 500 Angstroms.

11. A razor blade according to claim 10, wherein each of the coatings forming said plurality of coatings is from 50 to 450 Angstroms thick.

12. A razor blade according to claim 1, having a polymer coating on the alumina coating.

* * * * *